(12) United States Patent
Mennel

(10) Patent No.: US 6,814,922 B2
(45) Date of Patent: Nov. 9, 2004

US006814922B2

(54) METHOD AND DEVICE FOR PRODUCTION OF A BLOWN CONTAINER

(75) Inventor: Walter Mennel, Lustenau (AT)

(73) Assignee: ALPLA-Werke Alwin Lehner GmbH & Co. KG, Hard (AT)

( * ) Notice: Subject to any disclaimer, the term of this patent is extended or adjusted under 35 U.S.C. 154(b) by 0 days.

(21) Appl. No.: 10/204,810

(22) PCT Filed: Feb. 19, 2001

(86) PCT No.: PCT/IB01/00278

§ 371 (c)(1),
(2), (4) Date: Dec. 3, 2002

(87) PCT Pub. No.: WO01/62470

PCT Pub. Date: Aug. 30, 2001

(65) Prior Publication Data

US 2003/0122286 A1 Jul. 3, 2003

(30) Foreign Application Priority Data

Feb. 22, 2000 (CH) .............................................. 0336/00

(51) Int. Cl.[7] .............................................. B29C 49/08
(52) U.S. Cl. ...................... 264/533; 264/534; 264/535; 425/525; 425/526
(58) Field of Search ................................ 264/533, 534, 264/535; 425/525, 526

(56) References Cited

U.S. PATENT DOCUMENTS 3,106,745 A * 10/1963 King ........................... 425/525

3,408,692 A * 11/1968 Schaich ....................... 425/532
3,608,017 A    9/1971 Cines ........................... 264/89
4,195,053 A *  3/1980 Lambarth .................... 264/533

FOREIGN PATENT DOCUMENTS

EP         0 361 141          9/1995

* cited by examiner

Primary Examiner—Suzanne E. McDowell
(74) Attorney, Agent, or Firm—Wiggin and Dana LLP; Dale L. Carlson; Michael K. Kinney

(57) ABSTRACT

The invention relates to a method for the production of a container (45″), with an opening (53), whose opening axis (57) is at an angle to the container axis (23), whereby a blank (45) is introduced into a blowing mould (11, 13), a fixing region (47) of the blank (45) pressed against a stop zone (41) on the blowing mould and the blank pneumatically formed in the blowing mould. The fixing region (47) of the blank (45) is pressed against a stop zone (41) on the blowing mould, inclined at an angle other than 90°. The moulding thus occurs such that an opening region axis (58) of the blank (45, 45') is at an angle to the container region axis (59) of the blank (45, 45'). The opening axis (57), of the blowing mould (11), forms an angle to a longitudinal axis (51) of a stretching drift (49), which may be extended along the longitudinal axis thereof. Blanks (54) can be introduced into said blowing mould (11, 13), the container region (55) directionally fixed therein with a stretching drift (49) and the opening region (53) pressed against the inclined stop zone (41) by a pressing piece (33). The opening axis (57) of the blank is thus kinked relative to the container region (59) thereof.

19 Claims, 5 Drawing Sheets

METHOD AND DEVICE FOR PRODUCTION OF A BLOWN CONTAINER

BACKGROUND OF THE INVENTION

1. Field of the Invention

The invention relates to a method and a device for the production of a container with an opening, whose opening axis is at an angle to the container axis. In the method, a blank is introduced into a blow mold, and the container component of the blank is molded in the blow mold by means of blowing. A blow mold has in a blow mold body a blow mold cavity corresponding to the outer shape of the container, and a stop zone for a fixing region on a blank that can be inserted into the blow mold. In addition to such a blow mold, a blowing device also requires a blowing nozzle that can be sealed on the blank. Additionally, such blowing devices usually have a stretching pin for the stretching of the blank.

2. Discussion of Related Art

Bottles and containers blown with plastic blanks usually have an opening, the axis of which coincides with the container axis, or is arranged parallel to it. The blank is inserted into the opening being arranged orthogonal to the blow mold body into the blow mold cavity using tongs, and contacts the blow mold with a fixing region in the neck area. The insertion direction of the blank is parallel to the blowing mold axis. The walls of a container part of the blank are thereby positioned at a distance to the limitation of the blow mold cavity being approximate equal around the perimeter. The fixing region is now pressed using the blowing nozzles, and the blank is blown until the plastic walls have the shape of the blow mold cavity. Further in most cases a stretching pin is inserted into the blank, and the blank is stretched with it in the direction of its container axis. Practically at the same time, the blank is blown, and by that the material of the blank walls is stretched.

If it should be departed from the rule of the coincidence of the opening axis and the container axis, irregularities in the wall thickness are to be expected due to varying stretching conditions in the different areas of the blank walls. In the case of parallel axis, an irregular stretching of the blank walls can be counter-acted upon in narrow limitations, for instance by means of aimed warming of the blank. However, if the opening axis even extends at an angle to the container axis of the blow mold, the distances between the walls of the inserted blank and the limitations of the blow mold cavity vary with increasing distance from the opening. Achieving a nearly equal wall thickness of the finished container seems to be impossible with common rotation symmetric blanks with evenly thick walls and a common blowing method, or a common stretching and blowing method.

A method and a device for mold blowing of a plastic container with an opening axis extending at an angle to the container axis is known from EP-A-0361 141. The container is blown from a blank in a blow mold. For this purpose, the blank is inserted into a blow mold. Its fixing region in the area of the container opening is pressed onto the blow mold by means of a mold piece for the molding of the container's mouth piece. The mouthpiece is sealed with a blowing piece. A stretching pin extends through the blowing piece into the blank. A streching pin extends through the blowing piece into the blank. The blank can be stretched with the stretching pin. It also has a multitude of air intakes, through which compressed air is pressed into the blank during the blowing of the blank into a container.

The opening axis of the blank and the blow mold are directed vertical, namely parallel to a insertion direction of the blank and to a blow mold axis. In order for the neck axis of the container finally being at an angle to the container axis, a cavity axis of the blow mold cavity corresponding to the container axis is inclined at an angle to the insertion direction and the blow mold body axis, respectively.

In order to avoid a part on the neck area of the container resulting too thin, the container part of the blank is bent in the direction of the cavity axis. This can occur by means of molding the blank in a special mold before inserting it into the blow mold. It can also be deformed inside of the blow mold after insertion by means of a slide, or by means of stretching on a circular path with a curved stretching pin.

All of the suggested variations of the method for the molding of the blank need, besides insertion and blowing, an additional process step. This step increases the production time for a container.

It is therefore known that in a method for the production of a container with an opening, the opening axis of which is at an angle to the container axis, a blank is inserted into a blow mold, a fixing region of the blank is pressed against a stop zone on the blow mold, and the blank is pneumatically molded in the blow mold.

SUMMARY OF THE INVENTION

It is therefore the object of the invention to suggest a method and a device, with which it is possible, especially by using common rotation symmetric blanks, to blow a container, the final opening axis of which is arranged at an angle to the container axis. The wall thickness of the finished container shall be nearly constant at a cross section crosswise to the body axis. Particularly, the production time for a container shall be as short as possible.

This object is solved by pressing the fixing region of the blank against a stop zone on the blow mold being inclined at an angle other than 90° with respect to the insertion direction of the blank. Thus it is molded right during the insertion and stretching in such a way that an opening axis of the blank is at an angle to the container axis of the blank. By that an additional and production time extending molding step can be eliminated.

The angle between the axes of the blank is coordinated with the angle between the opening axis of the container and the container axis. Due to this, the walls of the container piece of the blank inserted into the blow mold and the blow mold cavity are, independent of the distance to the opening, at an approximate even distance to each other. This allows the use of blanks that are rotation symmetric at least in the container piece.

A container is produced using such a method, which has in particular container walls arranged around a body axis, and a container bottom, and the container bottom of which is usually parallel to a plane extending at an essentially right angle with respect to the container axis. The axis of its opening positioned opposite of the container bottom is at an angle to the body axis. Therefore, such containers, especially tilted neck bottles intended for toilet bowl cleaning, are advantageously produced by blowing in a blowing mold a blank made of thermoplastic plastic material and having walls, a bottom, and a pre-molded opening. A rotation symmetric blank is thereby molded before the blowing of the container piece in such a way that an axis extending through the opening of the molded blank extends at an angle to the symmetry axis of the blank's walls (container axis). The container axis of a rotation symmetric blank is coincident with the original rotation or symmetry axis of the blank. Preferably, the angle of the opening axis to the symmetry axis of the walls is smaller, or equally large, however especially preferably equally large as the deviation to be achieved of the opening axis to the body axis.

This measure ensures that a rotation symmetric blank can be used, and the walls can have wall thickness deviations coming from the tilting only in the already thicker neck area of the finished container. The finished container has practically no relevant wall thickness deviations in the walls and in the bottom, as with the previously mentioned tilting the walls of the blank are oriented approximately parallel to the wall of the container to be achieved. A difference between the angle of the container part axis to the opening axis of the blank, and the cavity axis to the opening axis of the blow mold cavity, can preferably be up to 6, or in case of low quality requirements, even up to 9 degrees, before the resulting wall thickness deviations effect the quality of the container.

In containers that must be stretched, the stretching direction is appropriately orthogonal to the orientation of the orthogonal and parallel-epipedic body of the blow mold. In order to obtain an opening axis tilted from the body axis, the blank inserted into the blow mold is stretched in a stretching direction that is at an angle to the opening axis. A fixing region designed at the neck of the blank is pressed against a stop zone on the blow mold. The plane of this stop zone is at an inclined angle with respect to the outer surface surrounding the stop zone, or at an inclined angle with respect to the orientation of the essentially prismatic and orthogonal body of the blow mold, and also to a possibly existing stretching direction. For a stretched container the stop zone can be at this angle merely toward the stretching direction. In a non-stretched container, the stop zone is at an angle other than 90° to the plane of the outer surface of the blow mold body surrounding the stop zone, or to the blow mold body axis, or to the body axis of the container to be blown, which corresponds to the cavity axis of the blow mold cavity.

Advantageously, the fixing region is pressed against the stop zone using a pressing piece. This pressing piece can be separate from the seal of the blowing nozzle, or advantageously have a seal, and coincide with the blowing nozzle. The pressing operation guarantees the right fit of the blank in the mold. The separation of the pressing piece of the blowing nozzle from a sealing piece arranged around it enables a diagonal pressing, and an orthogonal sealing of the nozzle. Surprisingly, however, it was shown that fewer errors occur in a pressing and sealing in a single step using a single piece.

Corresponding to the method, a blow mold for the production of a container with an opening, the opening axis of which is at an angle to the container axis, has a blow mold cavity in a blow mold body, and a stop zone for a fixing region of a blank able to be inserted into the blow mold. The blow mold cavity corresponds to a container outer shape, and the stop zone is inclined at an angle other than 90° with respect to the blow mold body axis. Corresponding to the angle of the opening to be achieved, the blow mold has a stop zone for a fixing region at the blank's neck, the plane of which extends at an angle other than 90° to the outer surface surrounding the stop zone, or an acute angle with respect to the orientation of the prismatic blow mold body deviating from 90° according to the angle between the opening axis and the stretching direction or the orientation of the blow mold body. The blow mold cavity corresponds to the finished container exterior form, and this deviation is smaller or equally large as the angle between the opening axis and the body axis of the finished container. The maximum angle between the opening axis and the body axis is within a range of up to 24° depending on the design of the opening and the manner of retaining of the tongs inserting the blank into the mold. This blow mold enables the molding of the blank simultaneously with its insertion into the blow mold cavity.

In order to achieve larger angles between the container axis and the opening axis, the cavity axis of the blow mold cavity, which is corresponding to the body axis of the container blown in the blow mold, is advantageously at an angle to the stretching direction and/or to the orientation of the essentially prismatic body of the blow mold. It must be considered, however, that the deviation of the cavity axis from the stretching axis should not be larger than approximately 6 degrees with average bottle proportions. More generally speaking, the maximum deviation of the stretching axis, or of the container axis of the blank from the body axis of the finished container, should not be more than 10 to 15% of the container diameter in deviation direction. Even more generally speaking, the ratio between the largest distances on a line approximately normal to the stretching axis and facing each other of the blow mold cavity to the stretching axis should be less than 2, or more than ½.

Appropriately, stretching occurs by means of a stretching pin. With the stretching along a straight line (straight-line translation of the stretching pin) at an angle to the opening axis through the opening of the blank, this angle is limited by the size of the opening and the diameter of the stretching pin. In order to increase this angle, advantageously the stretching pin has, at least in the direction crosswise to the stretching pin axis, a substantially smaller cross sectional dimension than the opening diameter of the blank. Advantageously, the other cross sectional dimension crosswise to the longitudinal axis of the stretching pin is as large as possible. Alternatively, the blank is stretched by a translation of the stretching pin along a curved path. This enables the use of a stretching pin having the largest possible circular cross section.

The stretching pin can be curved completely or partially. The curve can also have different radiuses. It must subsequently be fed on a path that accommodates this curve. This path can have different radiuses and tilt motions around different points. It must be laid out depending on the position, i.e., the degree of forward movement of the stretching pin, and depending on the mold and the degree of blowing of the container. It must be considered that the stretching pin may not touch either the blank walls, or the opening area of the blank. The path of the tip of the stretching pin must, of course, be positioned completely within the blow mold cavity. Therefore, the path must be adjusted to the container mold. At such a stretching pin not fed at a straight line, however, the opening axis can be at a larger angle to the container axis, than with stretching pins fed at a straight line.

The thermoplastic material preferred for the production of the blank and the container is PET (polyethylene terephtalate). PEN (polyethylene naphtalate) and other plastics are also used.

In a blow mold, the stop zone is oriented diagonal to the blow mold body axis, or to the outer surface of the blow mold body surrounding the stop zone and being oriented orthogonal to the blow mold body. In particular, the blow mold has a stop zone for a fixing region at the neck of the blank, the plane of which is at an acute angle of less than 90° to the orientation of the blow mold body, whereby the deviation of the right angle is smaller than the angle between the opening axis and the container axis of the finished container, or corresponds to this angle. The blow mold cavity has a diagonal neck axis. If on a blowing device with such a blow mold a device for the stretching of the blank is provided such as a stretching pin, the stretching direction is at an angle to the opening axis of the blow mold cavity. The plane of the stop zone is arranged at an inclined angle to the stretching direction, i.e., to the translation direction of a stretching pin being pushed along a straight line. This enables the direct blowing of so-called tilted neck bottles from a blank with rotation symmetric walls in a blow mold, and with a straight stretching pin. The blank's walls are stretched approximately centric into the blow mold cavity by the stretching pin that has been inserted into the blank at an angle to the opening axis.

Appropriately, the blowing nozzle has a movable interior piece for pressing the blank onto the stop zone, and, movable relative to this, an exterior sealing piece for the sealing of the nozzle to the blow mold body. Thus the pressing function and the sealing function can be performed separately, and successively. In particular, the pressing can occur on another plane than the sealing. Both of these planes can be at an inclined angle to each other. Preferably, however, the blowing nozzle is equipped with a seal, and seals the opening edge of the blank.

In a further developed advantageous embodiment, the longitudinal axis of the blow mold cavity is at an angle to the stretching direction and/or to the orientation of the blow mold body and its blow mold body axis. This enables the longitudinal axis of the blow mold cavity being at an angle to the opening axis that is larger than the angle between the opening axis of the blank and the container axis, or stretching axis. This way, larger angles between the opening axis and the body axis of the container are possible.

In a blowing device with a blow mold and means for inducing positive pressure into the blank, a transport device for the insertion or removal of a blank are also intended. A blow mold with a blank with rotation symmetric walls inserted into the blow mold is, according to the invention, characterized in that the container axis of the container piece of the blank is at an angle to the opening axis of a finished container's outer shape corresponding to the blow mold cavity. Simultaneously, the opening axis can extend at an angle to a longitudinal axis of a stretching pin movable along this longitudinal axis, namely when a fixing region of the blank provided around the opening abuts to the blow mold, or is pressed against the stop zone. The entire blank still has a rotation symmetric shape during the insertion. The opening axis is initially directed parallel to the stretching pin's longitudinal axis until the stretching pin is inserted into the blank so far that its container piece is fixed in its position by the stretching pin. Once the stretching pin is inserted into the blank, and the container area is thereby positioned and fixed in the direction, the fixing region of the blank is advantageously pressed against the blow mold by means of a pressing piece. The opening axis is tilted wit respect to the container axis by the stretching and pressing operation. Initially, one-sided pressure is exerted onto the fixing region, and the opening axis is thereby bent. When the fixing region abuts to the stop zone, the pressing piece symmetrically abuts to the blank. The stretching and pressing advantageously occurs synchronous up to that moment, in which the pressing piece presses the fixing region firmly onto the stop zone. Subsequently, the stretching operation is continued without interruption, and the blank is blown simultaneously. Axial shaped, rotation symmetric blanks with even wall thicknesses can be used for the inventive method.

BRIEF DESCRIPTION OF THE DRAWINGS

In the following the invention is explained in detail with reference to schematic sections through blowing devices. They show

Figure 1:
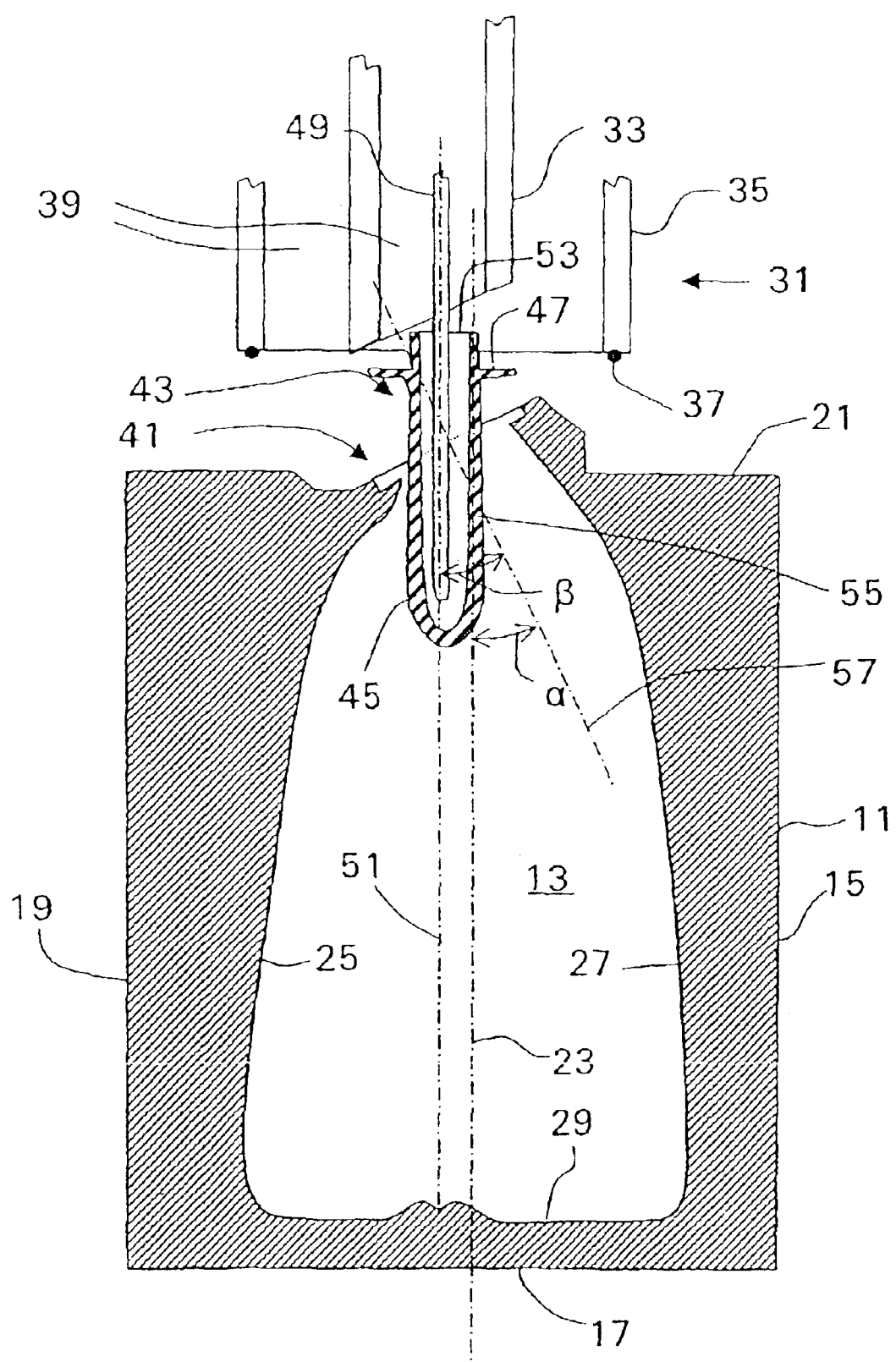
FIG. 1: a blowing device with blanks inserted parallel to the bottle axis.

The blowing devices according to FIGS. 1 to 5 have a blow mold 11 with a blow mold cavity 13. The blow mold body 11 is essentially prismatic. It has outer surfaces 15, 17, 19, 21 oriented orthogonal to each other. The blow mold cavity 13 forms the negative mold of a bottle body. This negative mold 13 is the limitation surface during the blowing operation of the bottle. A container axis or a cavity axis 23 can be assigned to it. The container axis is positioned nearly centric between the wall sections 25, 27, and approximately normal to the bottom section 29 of the negative mold 13.

The parts of the blowing nozzle 31 are movable practically orthogonal to the blow mold body 11, and parallel to a blow mold body axis. This is particularly at a right angle to the blow mold body side 21, which houses the opening 43. In an embodiment (FIGS. 1, 3, 4, 5), the blowing nozzle 31 has an internal pressing piece 33, and an external sealing piece 35. The sealing piece can firmly seal on the outer surface 21 of the blow mold body 11 by means of a sealing ring 37. For this purpose, the sealing ring 37 is vertically pressed onto the outer surface 21 by the sealing piece 35. Pressure can then be built up in the pressure chamber 39 scaled in this way for blowing the bottle. In another embodiment (FIG. 2), the blowing nozzle 31' is the sealing piece and the pressing piece in one. It presses against the opening edge of the blank opening 53 by means of a seal.

A stop zone 41 positioned at an angle to the outer surface 21 is designed on the blow mold 11. The stop zone 41 is arranged in the area around the opening 43 of the blow mold 11. A blank 45 can be inserted into the blow mold cavity 13 through the opening 43. A fixing region in the shape of a backup ring 47 is designed on the blank 45. The shapes of the backup ring 47 and the stop zone 41 are adjusted to one another. The end of the pressing piece 33 of the blowing nozzle 31 is adjusted to the diagonal position of the stop zone 41 with regard to the movement direction of the pressing piece.

In FIGS. 1 to 4 a stretching pin 49 is provided in each blowing nozzle 31. It can be inserted along its longitudinal axis 51 into the blank 45 through the opening 53 of the blank. The blank 45 can be stretched with the stretching pin 49 up to the vicinity of the bottom section 29. FIG. 5 shows an embodiment allowing the blank 45 not to be stretched. Therefore the example according to FIG. 5 does not show a stretching pin. But a retaining pin 49' is provided, so that the opening part of the blank can be tilted with respect to the container part retained by the retaining pin.

FIG. 1 illustrates the entire blank 45 being designed rotation-symmetrically. Its wall 55 is evenly thick all around. The unmolded blank is introduced into the opening 43 of the blow mold 11 in an orientation approximately according to the orientation of the stretching pin axis 51 and continually retained by tongs, the opening being diagonal to the stretching pin axis 51. The stretching pin 49 is inserted into the opening 53 of the blank 45 so that the position of the walls 55 of the blank are thereby secured. The tongs are now released, and the stretching and pressing operation begins. Instead of retaining the blank until after the insertion of the stretching pin (or retaining pin), the stop zone can be designed on a pivotable plate, which is retained in a position orthogonal to the blow mold, for instance by a spring, and which is pivoted into the desired position during the pressing operation of the blank, especially working against a spring force. Instead of a spring, a drive may also be intended. This drive enables an active adjustment of the plate, appropriately in coordination with the stretching pin and blowing nozzle movements.

In practical applications the stretching pin movement direction, the sealing piece and pressing piece movement directions, the blow mold axis, and the insertion direction for the blank are positioned parallel and orthogonal to the blow mold body 11. The bending of the opening axis 57 with respect to the stretching pin axis 51 is achieved by feeding the pressing piece 33 against the stop zone 41. The opening part is thereby bent relative to the wall 55 of the blank, in that the pressing piece 33 and the stop zone 41 exert pressure onto the opening part at the points of the retaining ring 47 facing each other in opposite direction, and the stretching pin inserted into the blank fixes the wall's orientation. As soon as the retaining ring abuts to the stop zone, the pressure chamber 39 is sealed with the sealing piece 35, and the blank 45 is molded into an tilted neck bottle.

Figure 2:
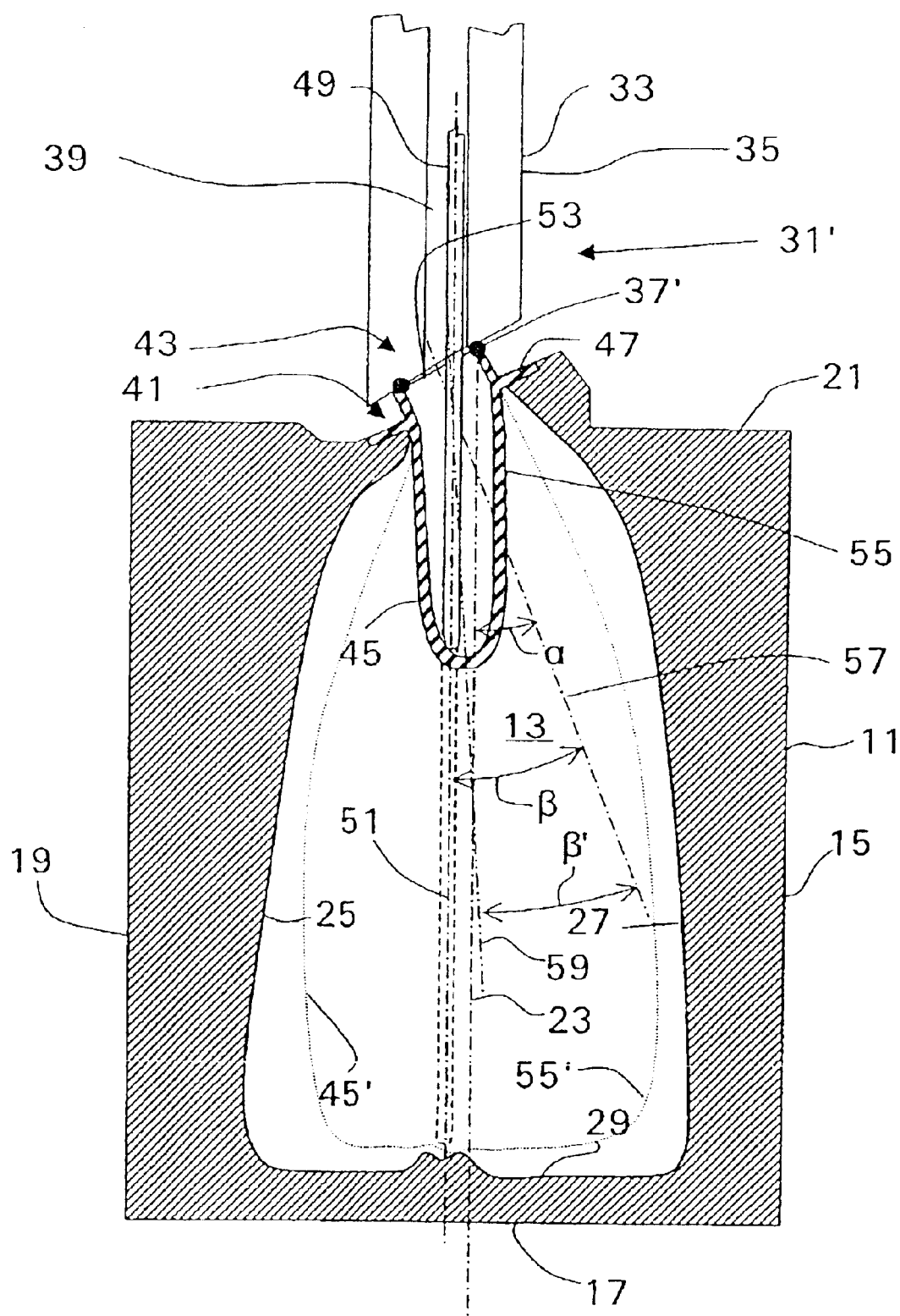
FIG. 2: a blowing device with an inserted and then bent blank.

FIG. 2 illustrates a different blowing nozzle 31' than shown in the other figures. This advantageous blowing nozzle does not require two separate parts for sealing and pressing, but instead seals, as soon as it abuts to the stop zone, directly on the opening edge of the blank by means of a seal. Simultaneously with the beginning stretching operation of the blank, pressure is exerted onto the opening edge of the blank 45 by means of the blowing nozzle 31'. The pressure may initially be exerted from only one side, while it abuts to the diagonal stop zone 41 of the blow mold 11 at the opposite side of the opening part. After the pressing operation has been completed, the fixing range completely abuts to the stop zone. From this moment on, the seal of the blowing nozzle seals the blank. The blowing operation is started immediately so that it is performed and completed parallel to the uninterrupted stretching operation.

Figure 3:
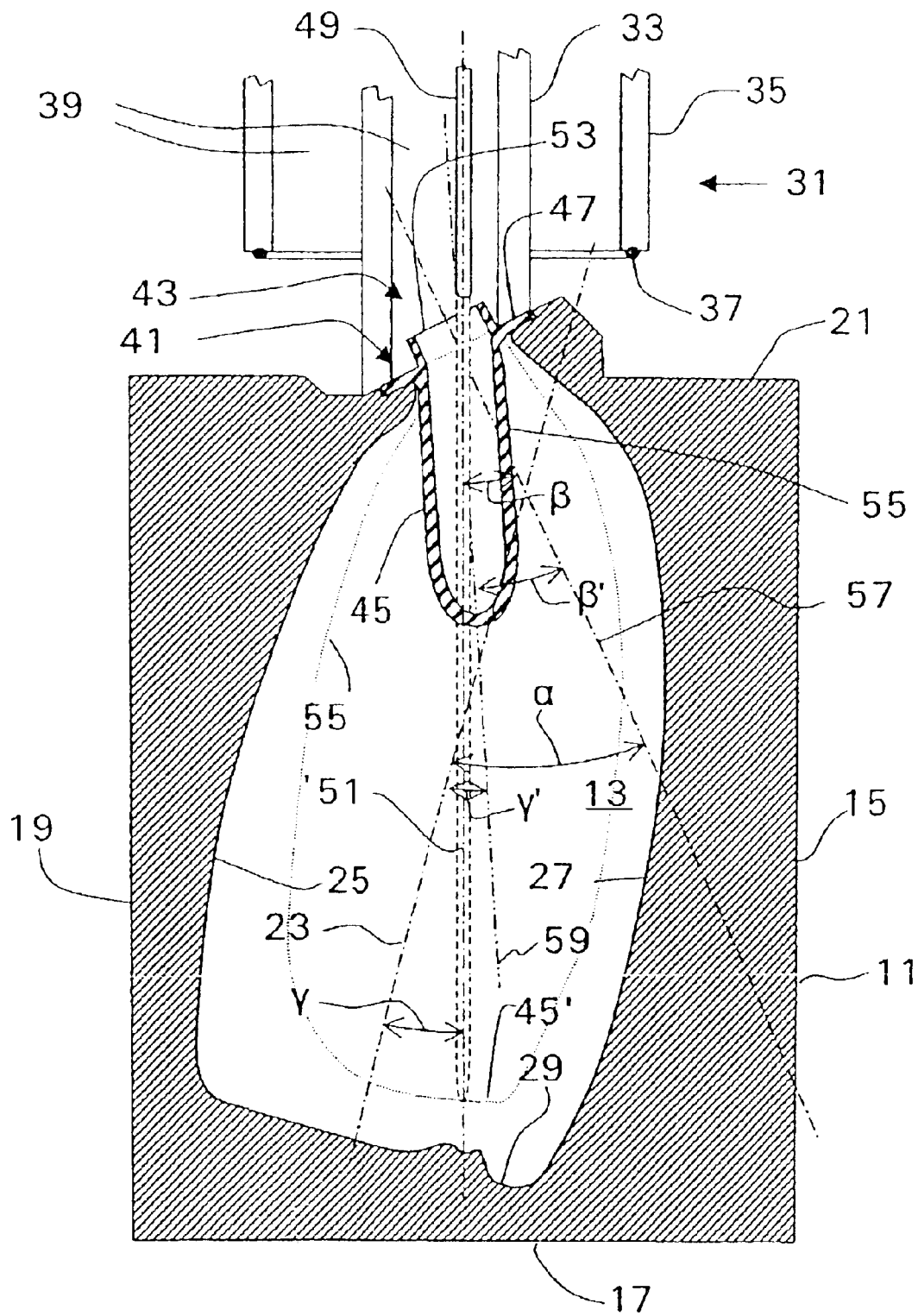
FIG. 3: a blowing device with a bent blank, and a blow mold cavity oriented diagonal relative to the blow mold body.

In FIG. 3, the container axis, or cavity axis 23, is not positioned orthogonal to the blow mold body 11, and is not at a right angle with respect to the blow mold body side 21. It is at an angle γ to the stretching pin's longitudinal axis 51, and to the orientation of the blow mold body 11, or its body axis. The opening axis 57 extending normal to the plane of the stop zone 41, extends therefore at an angle a with respect to the container axis 23, which angle corresponds to the sum of γ and β. β represents the angle between the longitudinal axis 51 of the stretching pin 49, or the orientation of the blow mold body 11 and the opening axis 57. The deviation of the stretching pin's longitudinal axis 51 from the parallel to the container axis of γ is compatible with the blowing operation as long as the distance differences between the stretched walls 55' of the blank 45' and the corresponding wall sections 25, 27 of the blow mold cavity 13 are within a certain tolerance range. If the tolerance range is exceeded, the differences in wall thicknesses in the different areas become too large.

As can be see in FIG. 2, for instance, a difference in the distances between the blank walls 55' and the blow mold cavity 13 can occur also with parallel positioning of the stretching pin's longitudinal axis 51 and the container axis 23. Further, the bottle does not have to be laid out rotation-symmetrically around the container axis. The deviation in FIG. 3 caused by the non-orthogonal positioning of the container axis is within this known range of tolerable distance differences . In the average, the deviation is even decreased by the diagonal position of the container axis 23. Depending on the container shape and with respective compensation by uneven heating of the blank, the larger distance can be up to 200% larger than the smaller one, without the resulting differences in wall thickness being inappropriate. Advantageously, however, this difference does not exceed 150%.

Figure 4:
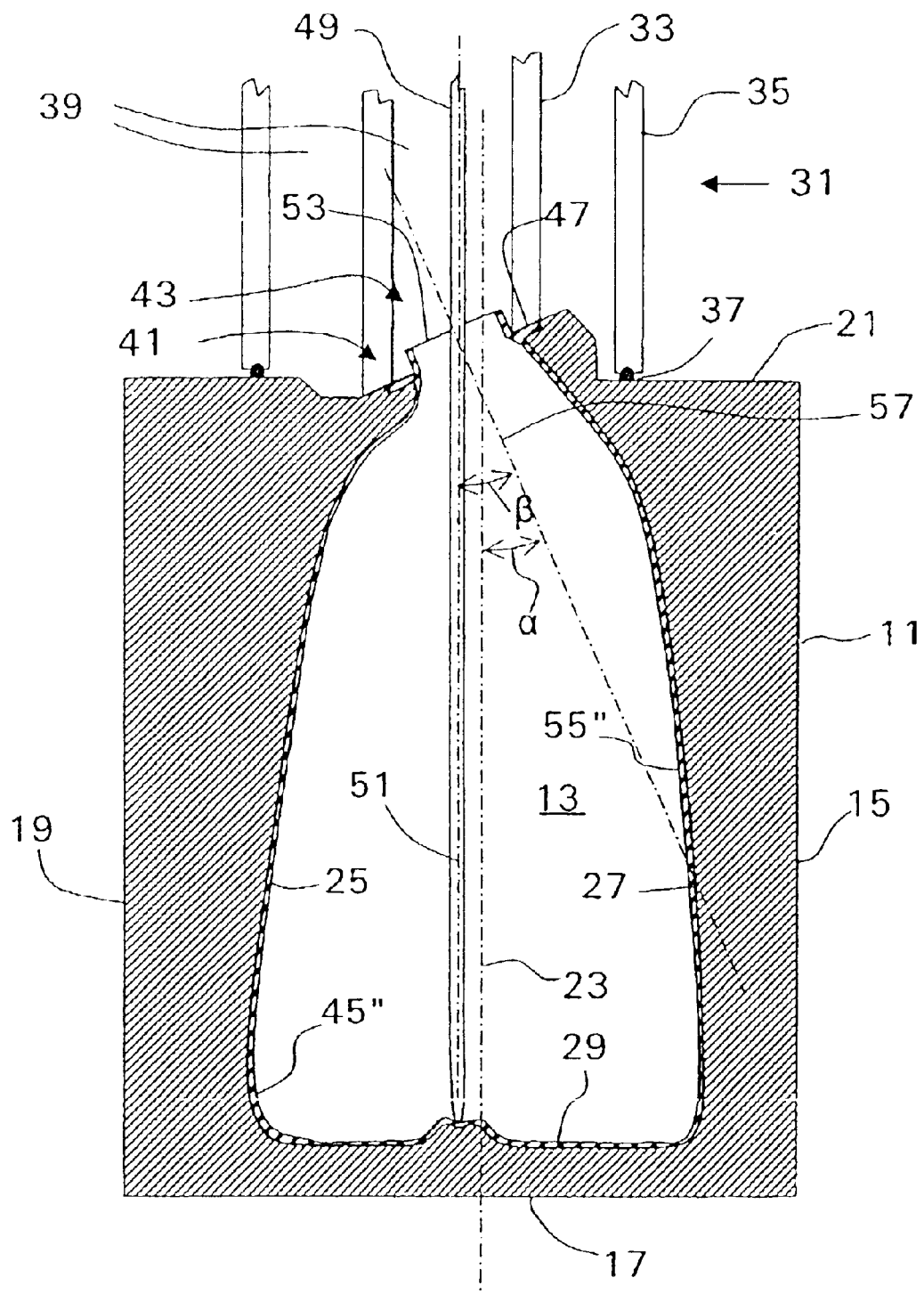
FIG. 4: a blowing device according to FIGS. 1 to 3 with a tilted neck bottle blown in the mold.
Figure 5:
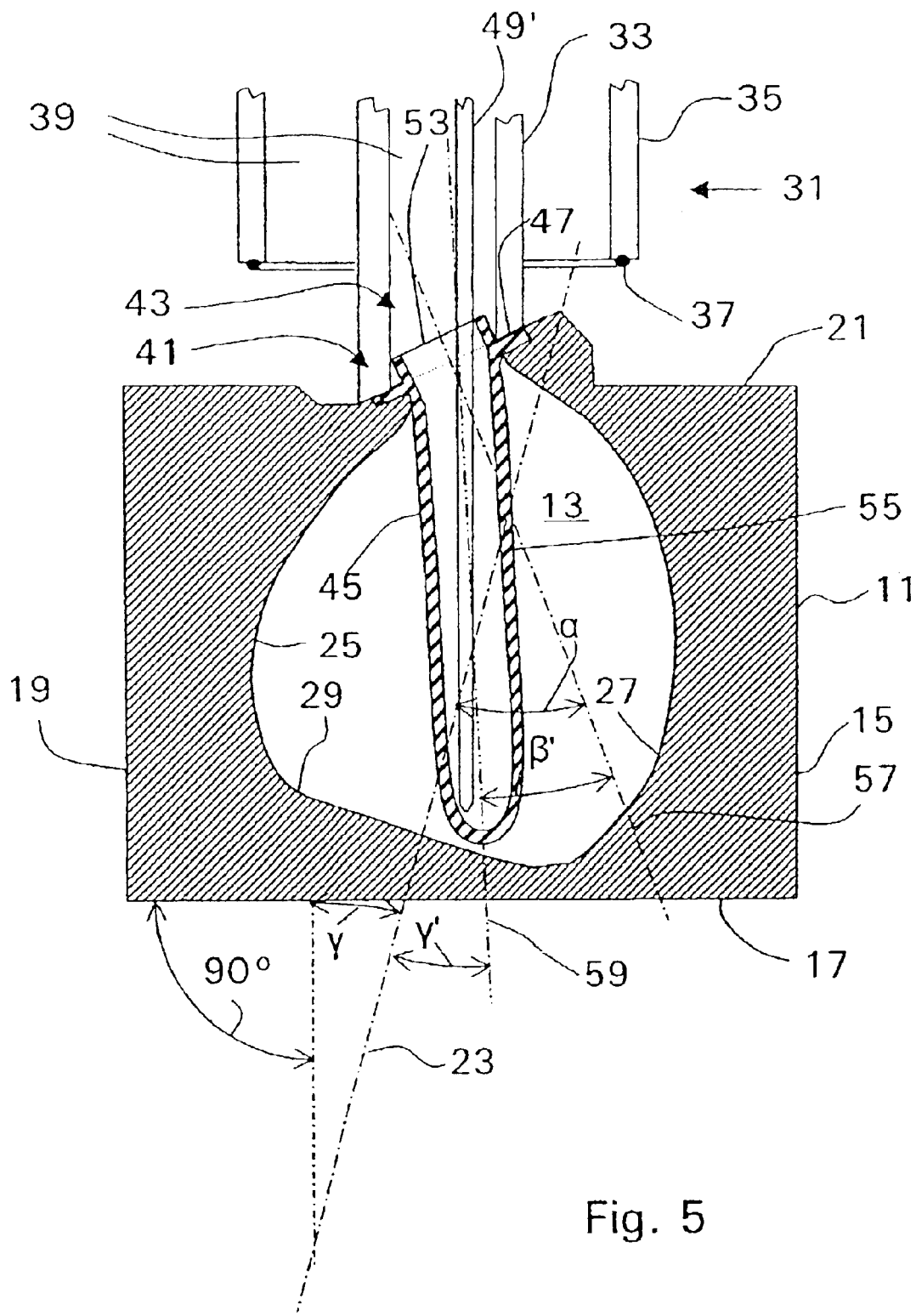
FIG. 5: a blowing device without a stretching pin.

In figure 4, the tilted neck bottle 45" is blown. For the blowing operation, the sealing piece 35 of the blowing nozzle 31 must be pressed tightly to the outer surface 21 on the opening's side of the blow mold body 11, and the blank 45 must be retained against the stop zone 41 by means of the pressing piece 33. The pressure chamber 39 can then be pressurized with positive pressure, and the blank 45 can thereby be blown into the tilted neck bottle 45". FIG. 4 also shows that the stretching pin 49 must be substantially narrower than the opening width of the bottle. In one direction the dimension of the stretching pin 49 is limited by the angle β between the stretching pin's longitudinal axis 51 and the opening axis 57, and by the relationship between the opening width and the length of the opening neck in the direction of the opening axis 57. In the other direction, in particular with small angles, it is essentially the opening width which is important. Therefore, the stretching pin advantageously does not have a circular, but an oval, elliptic, or bladder-ornament -like cross section (e.g., a biconvex (convexo-convex) like configuration).

The bottle shape illustrated in FIG. 5 is so that a stretching of the blank 45 can be eliminated. However, in order for the blank 45 to be arranged approximately in the center of the blow mold cavity 13 despite of a tilted neck embodiment at the bottle blow mold 11, the container part is held by means of a retaining pin 49', while the opening part is bent alone by the pressing piece 33 of the blowing nozzle 31.

In the figures, the angle between the pressing piece 33 and the opening axis 57 seems to be critical as, at a certain angle, the part of the retaining ring 47 facing away from the blowing nozzle 31 is in an area which does not allow the pressing piece 33 to be pressed against the stop zone 41 due to the opening edge 53 of the blank 45 protruding over the retaining ring 47. This problem does not occur with a one-part blowing nozzle 31', or a pressing piece 33, which presses against the opening edge. Furthermore and contrary to the illustration in FIGS. 1 to 5, the blowing nozzle can also be positioned diagonal onto the blow mold, In order to achieve larger angles of the opening axis, the stretching pin can also be inserted into the blank 45 on a circular path. For this purpose it is necessary to modify the blowing nozzle 31 accordingly. With this a pressing piece 33 and a sealing piece 35 may also coincide.

What is claimed is:

1. A method for the production of a container with an opening, an opening axis of which is at an angle to a container axis, from a blank using a blow mold having an opening and a cavity, an axis of the opening of the blow mold extending at an angle to an axis of the cavity, the blank having an opening part and a container part, the method comprising:

inserting the blank into the opening of the blow mold;

the blank having a fixed region around its opening and the blow mold having a stop zone around its opening;

pressing the fixing region of the blank against the stop zone of the blow mold, wherein the stop zone is inclined relative to an insertion direction of the blank at an angle other than 90°; and pneumatically molding the blank in the blow mold;

wherein the fixing region of the blank is pressed against the stop zone of the blow mold such that an axis of the opening part of the blank extends at an angle to an axis of the container part of the blank.

2. The method according to claim 1, wherein the container part of the blank includes walls, the method comprising:

fixing an orientation of the walls of the container part in the blow mold with one of a stretching pin and a retaining pin.

3. The method according to claim 2, comprising:

stretching the blank with the stretching pin in a stretching direction extending at an angle to an axis of the opening of the blow mold.

4. The method according to claim 3 wherein the blank is stretched by a straight-line translation of the stretching pin, the direction of the translation being inclined with respect to the axis of the opening part of the blank, and the stretching pin has, at least in one direction, a substantially smaller cross sectional diameter than a diameter of the opening part of the blank.

5. The method according to claim 3 wherein the stretching pin is bent at least partially along a longitudinal axis and the blank is stretched by a curved translation of the bent stretching pin.

6. A blow mold for production of a container having an opening and an axis of said opening extending at an angle to a body axis of said container, said blow mold comprising:

a blow mold body;

a blow mold cavity disposed within said blow mold body;

said blow mold cavity having an opening adapted to insert a blank through said opening into the blow mold cavity; and a stop zone around said blow mold cavity opening, said stop zone adapted to receive a fixing region of said blank to be inserted into said blow mold, said fixed region being arranged around said opening of said blank;

wherein said blow mold cavity corresponds to an outer shape of a container and wherein said stop zone is inclined at an angle other than 90° with respect to an axis of said blow mold body.

7. The blow mold according to claim 6 wherein said stop zone is located on a plate, said plate being pivotable relative to said blow mold body.

8. The blow mold according to claim 7, including:

spring means for adjusting said pivoting movement of said plate from an insertion position that is orthogonal to an axis of said blow mold body into a blowing position that is tilted to said axis of said blow mold body, and/or in reverse direction.

9. The blow mold according to claim 7, including:

active adjustment means for actively adjusting said pivoting movement of said plate from an insertion position that is orthogonal to an axis of said blow mold body into a blowing position that is tilted to said axis of said blow mold body, and/or in reverse direction.

10. A blowing device, comprising:

a blow mold having a blow mold body with an opening leading to a blow mold cavity within the blow mold body and a stop zone around said opening, said stop zone being adapted to receive a fixing region being arranged around an opening of a blank to be inserted through said opening into said blow mold, said blow mold body having an outer surface surrounding said stop zone, wherein said stop zone is inclined at an angle other than 90° with respect to said outer surface;

a blowing nozzle having a movable interior piece for pressing a blank onto said inclined stop zone and a separately movable exterior sealing piece for sealing said blowing nozzle onto said outer surface of said blow mold body surrounding said stop zone.

11. The blowing device according to claim 10, wherein said blow mold body includes a blow mold cavity and an opening of said body mold cavity, said blowing device further comprising:

a device for stretching of said blank in a stretching direction, said stretching direction being at an angle other than 90° to an axis of said opening of said blow mold cavity.

12. The blowing device according to claim 11, wherein said axis of said blow mold cavity extends at an angle to one of said stretching direction and to an axis of said blow mold body.

13. The blowing device according to claim 11, wherein an axis of said blow mold cavity is inclined at an angle other than 0° and 90° to orthogonal outer surfaces of said blow mold body.

14. The blowing device according to claim 11, wherein an axis of said blow mold cavity extends parallel to said stretching direction and an axis of said blow mold body.

15. A blowing device, comprising:

a blow mold having a blow mold body and a stop zone; and a blowing nozzle having a seal;

wherein said seal includes a surface inclined at an angle to an axis of said blow mold body other than 90°, and wherein said surface extends parallel to a plane of said stop zone.

16. The blowing device according to claim 15, wherein said blow mold body includes a blow mold cavity and an opening of said blow mold cavity, said blowing device further comprising:

a device for stretching of the blank in a stretching direction, said stretching direction being at an angle other than 90° to an axis of said opening of said blow mold cavity.

17. The blowing device according to claim 16, wherein an axis of said blow mold cavity extends parallel to said stretching direction and said axis of said blow mold body.

18. The blowing device according to claim 15, wherein an axis of said blow mold cavity is inclined with respect to one of said stretching direction and to said axis of said blow mold body.

19. The blowing device according to claim 15, wherein an axis of said blow mold cavity is inclined with respect to orthogonal outer surfaces of said blow mold body at an angle other than 0° and 9°.

* * * * *